(12) United States Patent
Hotta et al.

(10) Patent No.: US 8,081,553 B2
(45) Date of Patent: Dec. 20, 2011

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 272 days.

(21) Appl. No.: 12/324,248

(22) Filed: Nov. 26, 2008

(65) Prior Publication Data

US 2009/0154310 A1 Jun. 18, 2009

(30) Foreign Application Priority Data

Dec. 14, 2007 (JP) .................................. 2007-322699
Dec. 21, 2007 (JP) .................................. 2007-329582

(51) Int. Cl.
*G11B 7/00* (2006.01)

(52) U.S. Cl. .................................................. 369/112.02

(58) Field of Classification Search ............... 369/44.23, 369/44.24, 44.37, 112.01, 112.02, 112.1, 369/112.23, 112.03, 44.32, 112.05
See application file for complete search history.

(56) References Cited

U.S. PATENT DOCUMENTS

| | | | |
|---|---|---|---|
| 6,934,226 B2 * | 8/2005 | Yasuda et al. ............... | 369/44.23 |
| 7,012,875 B2 * | 3/2006 | Shimano et al. ......... | 369/112.02 |
| 7,245,565 B2 * | 7/2007 | Yamasaki et al. .......... | 369/44.32 |
| 7,369,481 B2 * | 5/2008 | Kimura et al. ............ | 369/112.23 |
| 7,453,787 B2 * | 11/2008 | Ogasawara et al. ...... | 369/112.15 |
| 7,564,764 B2 * | 7/2009 | Kimura .................... | 369/112.06 |
| 7,567,495 B2 * | 7/2009 | Kamisada et al. ........ | 369/112.12 |
| 7,680,003 B2 * | 3/2010 | Watanabe et al. .......... | 369/44.23 |
| 7,894,320 B2 | 2/2011 | Hayashi | |
| 7,894,322 B2 | 2/2011 | Kawamura | |
| 7,965,612 B2 | 6/2011 | Mori et al. | |
| 2003/0103437 A1 * | 6/2003 | Kimura .................... | 369/112.02 |

FOREIGN PATENT DOCUMENTS

| | | |
|---|---|---|
| JP | 2000-081566 | 3/2000 |
| JP | 2004-295983 | 10/2004 |
| JP | 2006-172605 | 6/2006 |

* cited by examiner

*Primary Examiner* — Nabil Z Hindi
(74) *Attorney, Agent, or Firm* — Fish & Richardson P.C.

(57) ABSTRACT

An optical pickup apparatus comprising: a laser diode emitting laser light having a first wavelength; an objective lens focusing the laser light having the first wavelength emitted from the laser diode to each signal recording layer of a first optical disc for which the laser light having the first wavelength is specified as laser light for reproducing a signal and a second optical disc for which laser light having a second wavelength different from the first wavelength is specified as laser light for reproducing a signal; and a spherical aberration correction element disposed in an optical path between the laser diode and the objective lens, the spherical aberration correction element correcting each spherical aberration of the first optical disc and the second optical disc to reproduce a signal recorded in each signal recording layer of the first optical disc and the second optical disc.

26 Claims, 6 Drawing Sheets

OPTICAL PICKUP APPARATUS

This application claims the benefit of priority to Japanese Patent Application Nos. 2007-322699 and 2007-329582, filed Dec. 14, 2007 and Dec. 21, 2007, respectively, of which full contents are incorporated herein by reference.

BACKGROUND OF THE INVENTION

1. Field of the Invention

The present invention relates to an optical pickup apparatus performing a reading operation of a signal recorded in an optical disc or a recording operation of a signal into the optical disc.

2. Description of Related Art

There are widely used optical disc devices capable of a signal reading operation and signal recording operation by applying laser light emitted from an optical pickup apparatus to a signal recording layer of an optical disc.

While there are widely available in general the optical disc devices using optical discs called CD and DVD, there have recently been developed those using optical discs improved in recording density, such as optical discs of a Blu-ray standard and an HD DVD (High Density Digital Versatile Disc) standard.

As laser light for performing the reading operation of a signal recorded in a CD standard optical disc, infrared light with a wavelength of 780 nm is used, and as laser light for performing the reading operation of a signal recorded in a DVD standard optical disc, red light with a wavelength of 650 nm is used.

Thickness of a protective layer provided on a top face of a signal recording layer of the CD standard optical disc is specified at 1.2 mm, and a numerical aperture of an objective lens used for the reading operation of a signal from this signal recording layer is specified at 0.45. Thickness of a protective layer provided on a top face of a signal recording layer of the DVD standard optical disc is specified at 0.6 mm, and a numerical aperture of an objective lens used for the reading operation of a signal from this signal recording layer is specified at 0.6.

Laser light with a short wavelength, such as blue violet light with a wavelength of 405 nm is used as the laser light for performing the reading operation of a signal recorded in an optical disc of Blu-ray standard and the HD DVD standard, as compared with the laser light for the reading operation in the case with such CD standard and DVD standard optical discs.

Thickness of a protective layer provided on a top face of a signal recording layer of the HD DVD standard optical disc is specified at 0.6 mm, and a numerical aperture of an objective lens used for the reading operation of a signal from this signal recording layer is specified at 0.65.

As described above, for the optical discs of different standards, since the laser lights for performing the reading operations of signals thereof are different in wavelength, in order to perform the reading operation of signals from all the optical discs, a configuration is made such that a laser diode emitting laser lights having different wavelengths is used (see Japanese Laid-Open Patent Publication No. 2004-295983).

To perform the reading operation of signals recorded in all the optical discs, since locations of the signal recording layers are different, it is required to change a numerical aperture corresponding to each of the optical discs. Therefore, there is developed an optical pickup apparatus capable of performing such an operation (see Japanese Laid-Open Patent Publication No. 2006-172605).

When performing the reading operation of signals recorded in optical discs by using the same objective lens and laser lights having different wavelengths, the respective focal points of the laser lights are different, and for this reason, there is developed an art using an objective lens having an annular diffraction grating formed on its incident face to focus laser lights having different wavelengths to the optical discs of different standards (see Japanese Laid-Open Patent Publication No. 2000-81566).

When performing the reading operation of signals recorded in optical discs of different standards, not only are there required a laser diode emitting the laser light having the wavelength corresponding to each of the optical discs and means for setting the numerical aperture of the objective lens corresponding to each of the optical discs, but also it is required to provide an optical component for each of the optical discs. Therefore, there are problems that a configuration becomes complicated, and moreover, production costs become high.

SUMMARY OF THE INVENTION

An optical pickup apparatus according to an aspect of the present invention, comprises: a laser diode configured to emit laser light having a first wavelength; an objective lens configured to focus the laser light having the first wavelength emitted from the laser diode to each of a signal recording layer of a first optical disc and a signal recording layer of a second optical disc, the first optical disc being an optical disc for which the laser light having the first wavelength is specified as laser light for reproducing a signal, the second optical disc being an optical disc for which laser light having a second wavelength different from the first wavelength is specified as laser light for reproducing a signal; and a spherical aberration correction element disposed in an optical path between the laser diode and the objective lens, the spherical aberration correction element being configured to correct each spherical aberration of the first optical disc and the second optical disc to reproduce a signal recorded in each of the signal recording layer of the first optical disc and the signal recording layer of the second optical disc.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
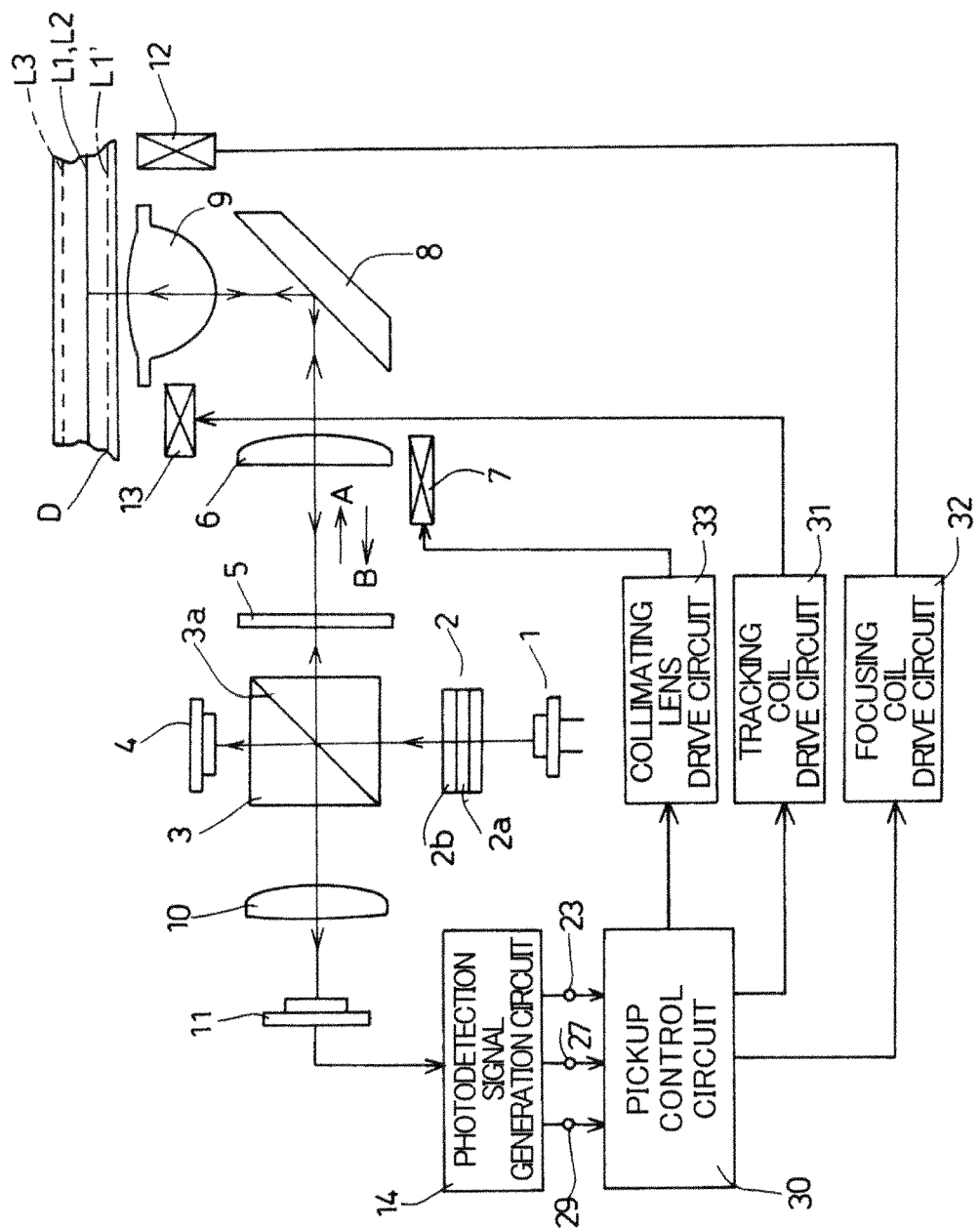
FIG. 1 is a diagram showing an optical pickup apparatus according to a first embodiment of the present invention.

At least the following details will become apparent from descriptions of this specification and of the accompanying drawings.

An optical pickup apparatus according to an embodiment of the present invention includes a laser diode for emitting laser light having a first wavelength, an objective lens for focusing the laser light emitted from the laser diode on a signal recording layer included in an optical disc, and a spherical aberration correction element provided in an optical path between the laser diode and the objective lens, wherein the optical pickup apparatus performs a reading operation of signals recorded in a first optical disc and second optical disc, which are in the same optical system and different in standard with each other, by performing a spherical aberration correction operation with the spherical aberration correction element.

An optical pickup apparatus according to an embodiment of the present invention includes a laser diode for emitting laser light having a first wavelength, an objective lens for focusing the laser light emitted from the laser diode on a signal recording layer included in an optical disc, and a spherical aberration correction element provided in an optics path between the laser diode and the objective lens, wherein the optical pickup apparatus performs a reading operation of signals recorded in a first optical disc, second optical disc, and third optical disc, which are in the same optical system and different in standard with each other, by performing a spherical aberration correction operation with the spherical aberration correction element.

An optical pickup apparatus according to an embodiment of the present invention uses a collimating lens included in an optical system as a spherical aberration correction element, and moves the collimating lens in an optical axis direction to perform a spherical aberration correction operation.

An optical pickup apparatus according to an embodiment of the present invention can use a liquid crystal control optical element as a spherical aberration correction element.

An optical pickup apparatus according to an embodiment of the present invention includes a photodetector made up of a four-divided sensor disposed at a position where return light, which is laser light reflected by a signal recording layer of an optical disc, is applied; generates a tracking error signal from a push-pull signal obtained from the four-divided sensor; and performs a tracking control operation for all the optical discs with the tracking error signal.

An optical pickup apparatus according to an embodiment of the present invention adjusts a focal point of the objective lens by a positioning operation of the collimating lens and the liquid crystal control optical element, to form a spot suitable for the reading operation of a signal on a signal recording layer formed in each of the optical discs.

An optical pickup apparatus according to an embodiment of the present invention not only performs the reading operation of signals recorded in a plurality of the optical discs of different standards with laser light emitted by one laser diode, but also performs the reading operation of signals from all the optical discs with the use of the same optical system. Therefore, a configuration becomes simple, so that manufacturing costs can be reduced.

An optical pickup apparatus according to an embodiment of the present invention performs the tracking control operation for all the optical discs with a push-pull signal obtained from the photodetector including a four-divided sensor. Therefore, a circuit configuration becomes simple, which is an advantage.

An optical pickup apparatus according to an embodiment of the present invention performs the reading operation of a signal from the first optical disc specified to perform the reading operation of a signal with the laser light having the first wavelength and from the second optical disc specified to perform the reading operation of a signal with the laser light having the second wavelength shorter than the first wavelength; includes the laser diode for emitting the laser light having the first wavelength, the objective lens for focusing the laser light emitted from the laser diode on the signal recording layer included in the optical disc, and the spherical aberration correction means provided in the optical path between the laser diode and the objective lens; and performs the reading operation of signals recorded in the first optical disc and second optical disc, which are in the same optical system, by performing a spherical aberration correction operation with the spherical aberration correction means.

An optical pickup apparatus according to an embodiment of the present invention includes the objective lens whose numerical aperture is set greater than the numerical aperture set corresponding to a standard of the second optical disc.

An optical pickup apparatus according to an embodiment of the present invention includes the objective lens whose numerical aperture is set based on the laser light having the second wavelength corresponding to the standard of the second optical disc and the numerical aperture set corresponding to the standard of the second optical disc.

An optical pickup apparatus according to an embodiment of the present invention includes the objective lens having an annular diffraction grating formed thereon, which sets the numerical aperture corresponding to the first optical disc.

First Embodiment

There will be described a case where the first optical disc is assumed to be the optical disc of Blu-ray standard, he second optical disc is assumed to be the optical disc of the HD DVD standard, and the third optical disc is assumed to be the optical disc of the DVD standard.

In FIG. 1, reference numeral 1 denotes a laser diode emitting the laser light having a wavelength suitable for a reading (reproducing) operation of a signal recorded in the first optical disc, which is blue violet light having a wavelength of 405 nm. Reference numeral 2 denotes a diffraction grating that the laser light emitted from the laser diode 1 enters, and that is made up of a diffraction grating portion 2a dividing the laser light into 0th order light, +1st order light and −1st order light, and half-wave plate 2b converting the incident laser light into linearly polarized light in the S-direction.

Reference numeral 3 is a polarizing beam splitter that the laser light having passed through the diffraction grating 2 is incident on, and is provided with a control film 3a reflecting an S-polarized laser light and allows the laser light having been polarized in P-direction to pass therethrough. Reference numeral 4 is a monitor photodetector provided at a position where the laser beam having passed through the control film 3a of the polarization beam splitter 3 out of the laser light emitted from the laser diode 1 is applied, and the detection output thereof is used to control the output of the laser light emitted from the laser diode 1.

Reference numeral 5 is a quarter-wave plate that is provided at a position where the laser light reflected by the control film 3a of the polarization beam splitter 3 is incident, and that converts the incident laser light from a linearly polarized light into circularly polarized light. Reference numeral 6 is a collimating lens that the laser light having passed through the quarter-wave plate 5 enters, that emits the incident laser light as parallel light or divergent light, and that is driven by a collimating lens drive coil 7 to move in an optical axis direction, i.e., directions of arrows A and B. By a movement operation of the objective lens in the optical axis direction of the collimating lens 6, a spherical aberration caused by the protective layer of an optical disc D is corrected and a focal point that is a position where the laser light is focused by the objective lens is adjusted, which will be described later.

Description is made in a case where the first optical disc is an optical disc of HD DVD standard. Specification is made such that when the optical disc D is the first optical disc or the second optical disc, the signal recording layers L1 and L2 of the optical discs are located in positions shown by solid lines, and when the disc D is the third optical disc, the signal recording layer L3 is located in a position shown by a broken line. That is, a distance between the signal recording layer L1 and a surface of the disc D facing the objective lens 9, and a distance between the signal recording layer L2 and the surface of the disc D are the same, and a distance between the signal recording layer L3 and the surface of the disc D facing the objective lens 9 is greater than the distance between the signal recording layer L1 and L2 and the surface of the disc D facing the objective lens 9. In other words, the protective layer of the third optical disc is thicker in thickness than the protective layer of the first and second optical discs.

Reference numeral 8 is a reflection mirror that the laser light having been converted into the parallel light by the collimating lens 6 is incident on and that reflects the laser light, and as described later, that the return light reflected from the signal recording layer L1, L2, and L3 of the optical disc D enters and that reflects the return light in a direction of the polarization beam splitter 3.

Reference numeral 9 is an objective lens which the laser light reflected by the reflection mirror 8 enters and which makes the laser light be focused on the signal recording layers L1, L2, and L3 of the optical disc D, and of which numerical aperture is set at 0.65 which is the first optical disc standard.

Reference numeral 10 is a sensor lens that the return light having passed through the control film 3a included in the polarization beam splitter 3 enters, and that has a cylindrical face, a flat face, a concave curved face, a convex curved face, etc. formed on a plane of incidence and plane of emission of the sensor lens.

This sensor lens 10 generates a focus error signal for performing a focus control operation by generating astigmatism in the return light. Reference numeral 11 is a photodetector that is disposed at a position where the return light having passed through the sensor lens 10 is condensed to be applied, and that is made up of a four-divided sensor, in which photodiodes are arranged, etc., as described later.

Reference numeral 12 is a focusing coil for performing a focusing operation of the laser light by moving the objective lens 9 in a direction perpendicular to a signal surface of the optical disc D, and reference numeral 13 is a tracking coil for moving the objective lens 9 in a radial direction of the optical disc D.

Reference numeral 14 is a photodetection signal generation circuit for generating a tracking error signal, focus error signal, and a reproduction signal read from the optical disc D based on a signal obtained from the photodetector 11, and specific examples thereof are described with reference to FIGS. 5 and 6.

The tracking error signal generation circuit for generating a tracking error signal is described with reference to FIG. 5. A light receiving portion incorporated into the photodetector 11 includes a four-divided sensor portion 11a, which is a main light receiving portion to be irradiated with a main beam M as shown in FIG. 5, and two-divided sensor portions 11b and 11c, which are sub light receiving portions to be irradiated respectively with sub beams S1 and S2. The four-divided sensor portion 11a is made up of sensors A, B, and C and D divided with a dividing line in a direction of a signal track of the optical disc D and a dividing line in a direction orthogonal to the direction of the signal track, as shown in the figures, and the two-divided sensor portions 11b and 11c are respectively made up of the sensors E and F and the sensors G and H, which are divided with dividing lines in the direction of the signal track of optical disc D.

In such a configuration, if a spot position of the laser light deviates in the radial direction of the optical disc D from the signal truck provided in the signal recording layers L1, L2, and L3 of the optical disc D, that is, if the spot position deviates in the tracking direction, positions of spots formed by irradiation of the main beam M on the four-divided sensor portion 11a and the two-divided sensor portions 11b and 11c, and spot positions of the sub beams S1 and S2 move in a direction of an arrow C or D. As a result, an amount of light received at each sensor changes.

Figure 5:
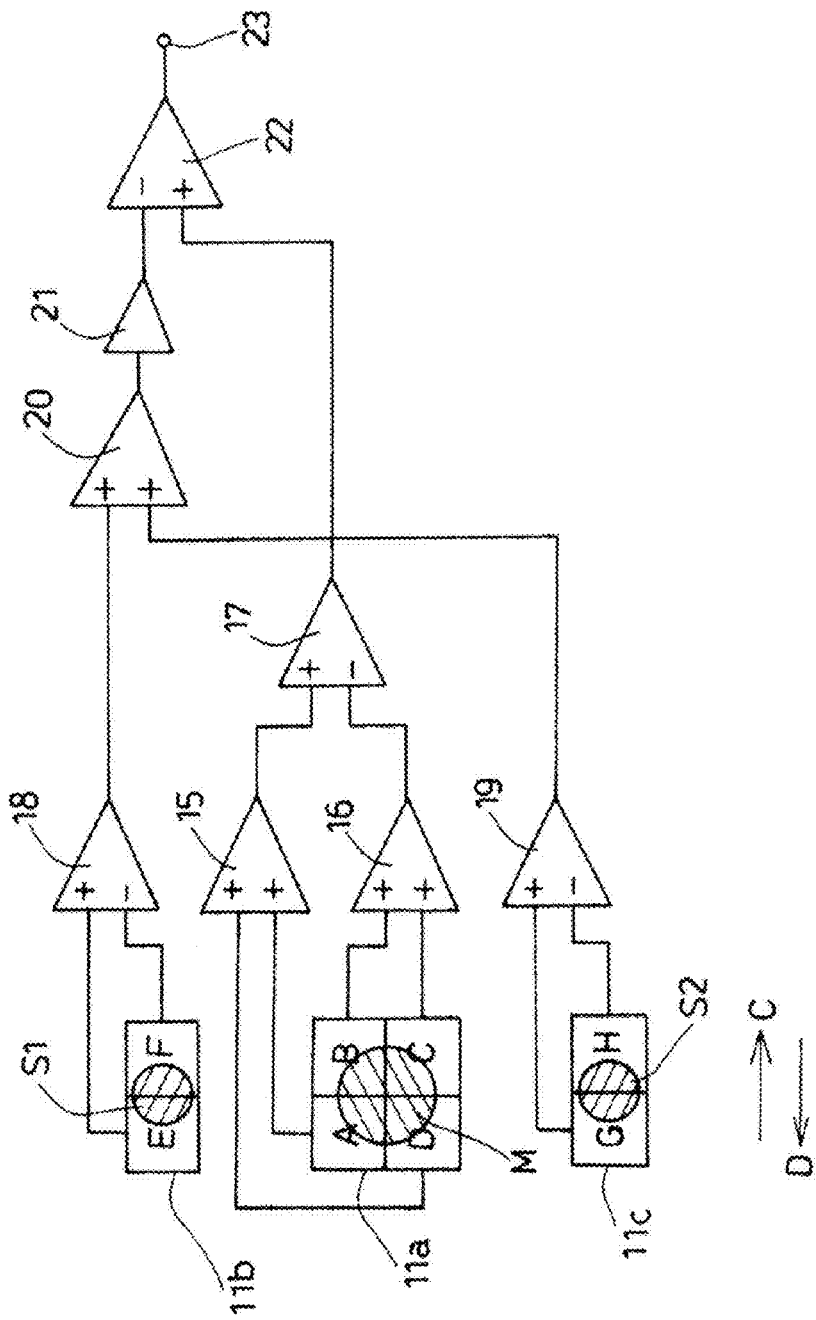
FIG. 5 is a diagram showing an example of a circuit for generating a tracking error signal.

FIG. 5 is a schematic diagram of a circuit for generating the tracking error signal for performing a tracking control operation called a differential push-pull method, and the tracking error signal is generated by the main push-pull signal and the sub push-pull signal, described later. In FIG. 5, reference numeral 15 is a first adder for adding a signal obtained from the sensor A and a signal obtained from the sensor D, wherein the sensors A and D make up the four-divided sensor portion 11a, which is irradiated with the main beam M. Reference numeral 16 is a second adder for adding a signal obtained from the sensor B and a signal obtained from the sensor C, wherein the sensors B and C are irradiated with the main beam M, in the same manner. Reference numeral 17 is a first subtracter for subtracting an output signal of the second adder 16 from an output signal of the first adder 15. Reference numeral 18 is a second subtracter for subtracting a signal obtained from the sensor F from a signal obtained from the sensor E, wherein the sensors E and F make up the two-divided sensor portion 11b, which is irradiated with the sub beam S1. Reference numeral 19 is a third subtracter for subtracting a signal obtained from the sensor H from a signal obtained from the sensor G, wherein the sensors G and H make up the two-divided sensor portion 11c, which is irradiated with the sub beam S2.

Reference numeral 20 is a third adder for adding an output signal of the second subtracter 18 and an output signal of the third subtracter 19. Reference numeral 21 is an amplifier circuit for amplifying an output signal of the third adder 20 by K times (K is a constant which is set based on a ratio between light amount of the main beam M and light amount of the sub beams S1 and S2). Reference numeral 22 is a fourth subtracter for subtracting an output signal of the amplifier circuit 21 from an output signal of the first subtracter 17, and an output signal of the fourth subtracter 22 is output to an output terminal 23 as the tracking error signal.

When assuming that signals obtained from sensors A, B, C, D, E, F, G, and H are A, B, C, D, E, F, G, and H, respectively, and that the tracking error signal is TE, the tracking error signal TE is obtained by calculation using an expression: $TE=(A+D)-(B+C)-K\{(E-F)+(G-H)\}$. That is, the tracking error signal TE is obtained by calculation using an expression of the main push-pull signal generated from outputs of the sensors of the four-divided sensor portion 11a: $(A+D)-(B+C)$, and expressions of the sub push-pull signals generated from outputs of sensors of the two-divided sensor portions 11b and 11c: $(E-F)$ and $(G-H)$, respectively.

The generation circuit of the tracking error signal TE included in the photodetection signal generation circuit 14 is configured as described above, and a generation operation of the focus error signal FE and reproduction signal RF is hereinafter described with reference to FIG. 6.

First, the generation operation of the focus error signal FE is described. The generation operation of the focus error signal FE by an astigmatic method is performed by using change of a shape of the main beam M on the four-divided sensor portion 11a into an elliptical shape when focus is deviated in the focusing operation with the objective lens 9, where the shape of the main beam M is defined as a shape of a spot formed by the irradiation of the main beam M on the four-divided sensor portion 11a.

Figure 6:
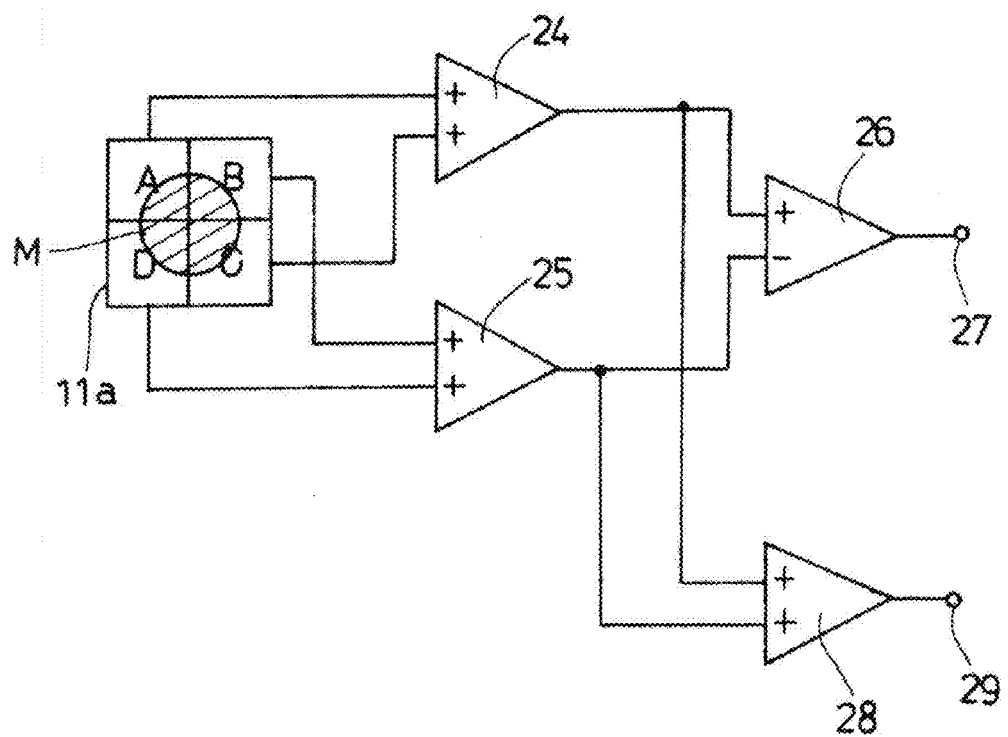
FIG. 6 is a diagram showing an example of a circuit for generating a focusing error signal and reproduction signal.

In FIG. 6, reference numeral 24 is a fourth adder for adding a signal obtained from the sensor A and a signal obtained from the sensor C, wherein the sensors A and C make up the four-divided sensor portion 11a, which is irradiated with the main beam M. Reference numeral 25 is a fifth adder adding a signal obtained from the sensor B and a signal obtained from the sensor D, wherein the sensors B and D are irradiated with the main beam M, in the same manner. Reference numeral 26 is a fifth subtracter for subtracting an output signal of the fifth adder 25 from an output signal of fourth adder 24, and an output signal of the fifth subtracter 26 is output to an output terminal 27 as the focus error signal.

The focus error signal FE is thus generated by the astigmatic method. The generation operation of the focus error signal FE is performed, as described above, and a generation operation of a reproduction signal is performed as follows. That is, in FIG. 6, reference numeral 28 is a sixth adder for adding an output signal of the fourth adder 24 and an output signal of the fifth adder 25, and an output signal of the sixth adder is output to an output terminal 29 as the reproduction signal RF. That is, the reproduction signal of a signal recorded in the optical disc D is obtained by adding signals obtained from all the sensors A, B, C, and D making up the four-divided sensor portion 11a, which is irradiated with the main beam M.

The photodetection signal generation circuit 14 shown in FIG. 1 is configured as shown in FIGS. 5 and 6, and the tracking error signal TE, focus error signal FE, and reproduction signal RF respectively generated in the circuits are, respectively output from the output terminals 23, 27, and 29.

Reference numeral 30 is a pickup control circuit for controlling an operation of an optical pickup apparatus based on a signal output from the photodetection signal generation circuit 14 and a signal output from a control circuit included in an optical disc device, although not shown. Reference numeral 31 is a tracking coil drive circuit that the tracking control signal output from the pickup control circuit 30 is applied to, and that supplies the driving signal corresponding to the above tracking error signal TE to the tracking coil 13. As a result of such a driving signal being supplied to the tracking coil 13, the objective lens 9 is moved in the radial direction of the optical disc D, wherein the direction of movement is such a direction that the above tracking error signal TE is reduced in value. As a result of such an operation is performed, there can be performed an operation, i.e., the tracking control operation, for making a laser spot formed by a focusing operation with the objective lens 9 follow the signal track provided on the signal recording layers L1, L2, and L3 of the optical disc D.

Reference numeral 32 is a focusing coil drive circuit that a focus control signal output from the pickup control circuit 30 is applied to, and that supplies a driving signal corresponding to the above focus error signal FE to the focusing coil 12.

As a result of such a driving signal being supplied to the focusing coil 12, the objective lens 9 is moved in the direction perpendicular to the signal face of the optical disc D, wherein the direction of movement is such a direction that the above focus error signal TE is reduced in value. As a result of such an operation being performed, there can be performed an operation, i.e., the focusing control operation, for forming the laser spot, which is formed by the focusing operation with the objective lens 9, on each of the signal recording layers L1, L2, and L3 of the optical disc D.

Reference numeral 33 is a collimating lens drive circuit that a collimating lens position control signal output from the pickup control circuit 30 is applied to, that supplies a driving signal to the collimating lens drive coil 7, and that moves the collimating lens 6 in the directions of the arrows A and B, i.e., the optical axis direction.

The collimating lens 6 is thus moved in the directions of the arrows A and B, such a movement operation is performed corresponding to the optical disc D to be used, i.e., the first optical disc, the second optical disc, or the third optical disc. The collimating lens 6 for being controlled as to movement by such an operation is set in such a position that a spherical aberration is corrected, i.e., a spherical aberration is the smallest, in the optical discs to be used.

While a correction operation of a spherical aberration is performed by a position adjustment of the collimating lens 6 as described above, since the signal recording layer L3 of the third optical disc is in the farthest position from the objective lens 9, a configuration is made such that the emitted light of the collimating lens 6 becomes divergent light in using such third optical disc. That is, by emitted light of the collimating lens 6 into the divergent light, the focal point by the objective lens 9 is so adjusted as to be in a position on the signal recording layer L3.

A first embodiment according to the present invention shown in FIG. 1 is configured as described above, and an operation of the optical pickup apparatus configured as above will next be described. When performing a reproduction operation of a signal recorded in the optical disc D, a drive current is supplied to the laser diode 1, and the laser light having a wavelength of 405 nm is emitted from the laser diode 1. The laser light emitted from the laser diode 1 enters the diffraction grating 2, to be divided into 0th order light, +1st order light, and −1st order light by the diffraction grating 2a making up the diffraction grating 2, and converted into the linearly polarized light in the S-direction by the half-wave plate 2b. The laser light having passed through the diffraction grating 2 enters the polarization beam splitter 3, and thereafter, the incident laser light is reflected by the control film 3a included in the polarization beam splitter 3 with a portion of the incident laser light passing therethrough to be applied to the monitor photodetector 4.

The laser light reflected by the control film 3a enters the collimating lens 6 through the quarter-wave plate 5, and is converted into parallel light due to a function of the collimating lens 6. The laser light converted into the parallel light by the collimating lens 6 is reflected by the reflection mirror 8, and then enters the objective lens 9. The laser light incident on the objective lens 9 is applied as a spot onto the signal recording layers L1, L2, and L3 of the optical disc D by the focusing operation with the objective lens 9. Thus, while the laser light emitted from the laser diode 1 is applied as a desired spot to the signal recording layers L1, L2, and L3 of the optical disc D, the numerical aperture of the objective lens 9 in this case is set at 0.65, which is the numerical aperture for the first optical disc.

When performing the focusing operation of the laser light with the above objective lens 9, a spherical aberration occurs due to difference in thickness of the protective layer between the signal recording layers L1, L2, and L3, and the signal incident face of optical disc D, however, the collimating lens 6 is moved in a position where a spherical aberration of the optical disc D is the smallest, and therefore, influence of a spherical aberration can be eliminated. When using the third optical disc, the collimating lens 6 performs the correction operation of a spherical aberration and an adjustment operation of the focal point, so that there is performed an operation for forming the laser spot suitable for a signal reading operation on the signal recording layer L3.

There is performed an operation of applying the laser light onto the signal recording layers L1, L2, and L3 provided in the optical disc D by the above described operation, and when performing such an applying operation, the return light reflected from the signal recording layers L1, L2, and L3 enters the objective lens 9 from the optical disc D side. The return light incident on the objective lens 9 enters the polarization beam splitter 3 through the reflection mirror 8, the collimating lens 6, and the quarter-wave plate 5.

Since the return light entering the polarization beam splitter 3 has been converted into the linearly polarized light in the P-direction, the return light passes through the control film 3a included in this polarization beam splitter 3. The return light of the laser light having passed through the control film 3a enters the sensor lens 10, and the astigmatism is generated due to a function of the sensor lens 10. The return light in which astigmatism is generated by the sensor lens 10 is applied to a sensor portion, such as the four-divided sensor, included in the photodetector 11 by the condensing operation of the sensor lens 10. As a result of the return light being thus applied to the photodetector 11, the generation operation of the tracking error signal TE, focus error signal FE, and reproduction signal RF is performed by the photodetection signal generation circuit 14 as described above, by using change in form of the spot to be applied to the sensor portion included in the photodetector 11.

When the generation operation of the tracking error signal TE, focus error signal FE, and regenerative signal RF is performed by the photodetection signal generation circuit 14, the pickup control operation is performed by the pickup control circuit 30 to which such signals are input. That is, since the control operation of the driving signal supplying to the tracking coil 13 is performed with a supply operation of the tracking control signal from the pickup control circuit 30 to the tracking drive circuit 31, the tracking control operation in an optical pickup apparatus is performed.

Moreover, since the control operation of the driving signal supplying to the focusing coil 12 is performed with a supply operation of the focusing control signal from the pickup control circuit 30 to the focusing drive circuit 32, the focusing control operation in an optical pickup apparatus is performed. The reproduction signal RF read from the optical disc D is supplied to a decode circuit included in the optical disc apparatus, so that a signal demodulation operation is performed.

As described above, there are performed the tracking control operation and focus control operation in the optical pickup apparatus so that there is performed the reading operation of a signal recorded in the optical disc D. Since a portion of the laser light irradiates the monitor photodetector 4 when the reading operation is performed, a value of the drive current to be supplied to the laser diode 1 can be controlled using a monitor signal obtained from the monitor photodetector 4.

Since an output of the laser light can be controlled by controlling the value of the drive current to be supplied to the laser diode 1, there can be performed not only the reading operation of a signal recorded in the optical disc D, but also the adjustment operation of a laser output required when recording a signal into the optical disc D.

When the first optical disc is the optical disc of the Blu-ray standard, a signal recording layer L1' of the optical disc D is in a position shown with an alternate long and short dash line, and a distance between the signal recording layer L1' and the surface of the disc D facing the objective lens 9 is shorter than the distance between the signal recording layer L2 and the surface of the disc D facing the objective lens 9. That is, the protective layer of the first optical disc is thinner in thickness than the protective layer of the second optical disc.

When the first optical disc is the optical disc of the Blu-ray standard, the numerical aperture of the objective lens 9 is set at 0.85, which is the specification of the first optical disc.

The position adjustment of the collimating lens 6 is performed such that the emitted light of the collimating lens 6 is made into the parallel light for the first optical disc and the emitted light thereof is made into the divergent light for the second and third optical discs, and by making an angle of divergence of the divergent light greater in order of the second optical disc and the third optical disc, the positions on which the parallel light and the divergent lights are focused by the objective lens 9 are respectively positioned on the signal recording layer L1' for the first optical disc, on the signal recording layer L2 for the second optical disc, and on the signal recording layer L3 for the third optical disc.

Second Embodiment

Figure 2:
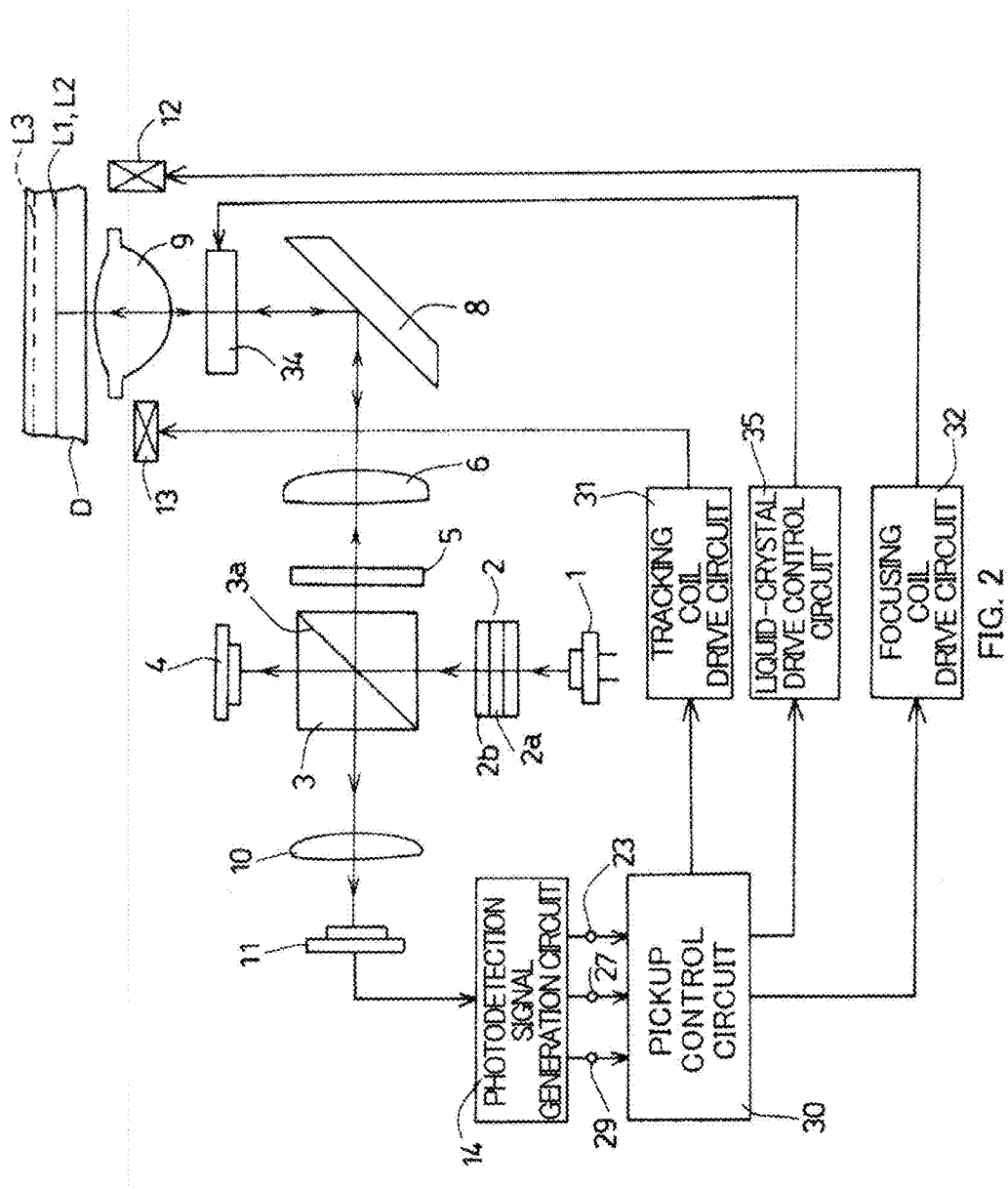
FIG. 2 is a diagram showing an optical pickup apparatus according to a second embodiment of the present invention.

A second embodiment according to the present invention shown in FIG. 2 will next be described. In FIG. 2, components equivalent to those shown in FIG. 1 are designated by the same reference numerals to omit the descriptions thereof.

In FIG. 2, reference numeral 34 is a liquid-crystal control optical element which uses a liquid crystal as a spherical aberration correction element, and in which there is formed an electrode pattern for correcting a spherical aberration generated from each optical disc D. Reference numeral 35 is a liquid-crystal drive control circuit that controls an operation of the liquid-crystal control optical element 34 based on a control signal supplied from the optical pickup control circuit 30, and that controls liquid crystal so that a pattern shape becomes in a shape suitable for correcting a spherical aberration of each optical disc D to be used.

While the liquid-crystal control optical element 34 is so configured as to correct a spherical aberration as described above, it is also configured such that the laser spot suitable for the signal reading operation is generated on the signal recording layer L3 by moving the focal point of the objective lens 9 when using the third optical disc.

Although the same control operation is performed in the optical pickup apparatus shown in FIG. 2 as in the first embodiment shown in FIG. 1, a pickup apparatus in FIG. 2 differs in that the correction operation of a spherical aberration is performed with the liquid-crystal control optical element 34 instead of a moving operation of the collimating lens 6.

Tracking Control Operation in First and Second Embodiments

As described above, while operations of the first and second embodiments shown in FIGS. 1 and 2 are performed, the tracking control operation by the differential push-pull method described in the first and second embodiments will next be described.

Such a tracking control operation is performed using a signal obtained from the four-divided sensor portion 11a, i.e., (A+D)−(B+C), as described above, and such a signal is obtained using difference in height between land and groove formed on the signal recording layer.

That is, when taking φ to represent a phase difference of the return light obtained from the difference in height of the land and groove, λ to represent the wavelength of the laser light, n to represent a refractive index of the protective layer covering the signal recording layers L1, L2, and L3 of the optical disc D, and d to represent a depth of the groove, a phase difference φ can be expressed by the equation, $\phi=2\pi/\lambda \times 2nd$. As obvious from the equation, since the phase difference φ is n in a case of $d=\lambda/4n$, a push pull signal becomes 0, so that the tracking error signal can not be generated.

Therefore, a specification of the optical disc is set such that d, which is the depth of the groove, is in a relationship expressed by $d=\lambda/5n$, in consideration of the wavelength, the refractive index, etc. of the laser light to be used.

In the first and second embodiments, the wavelength of the laser light is set at 405 nm and the numerical aperture of the objective lens is set at 0.65, and in a specification of the optical disc of the HD DVD standard, which is the first optical disc, on these conditions, the depth d of the groove is set by $d=\lambda/5n$. Therefore, when using the first optical disc, since the tracking error signal for performing the tracking control operation by differential push-pull can be generated, the tracking control operation by the differential push-pull method can be performed without trouble.

On such conditions, the depth d of the groove in the specification of the optical disc of the DVD standard, which is the second optical disc, is set by $d=\lambda/3n$ in a case of DVD-R/RW, and there can be generated the tracking error signal for performing the tracking control operation by differential push-pull. The value of this d corresponds to a value of $\lambda/5n$ in a case of the wavelength of 660 nm of the laser light, which is set corresponding to the optical disc of the DVD-R/RW standard.

In a case of a DVD-ROM in the optical disc of the DVD standard, the depth d is set by $d=\lambda/2.4n$, and there can be generated the tracking error signal for performing the tracking control operation by a differential push-pull. The value of this d corresponds to a value of $\lambda/4n$ in a case of the wavelength of 660 nm of the laser light, which is set corresponding to the optical disc of the DVD-ROM standard. Since the depth d of the groove of the DVD-ROM is set at $\lambda/4n$ when using the laser light having a wavelength of 660 nm, the push-pull signal cannot be obtained. Therefore, in an ordinary optical pickup apparatus, since the tracking control operation by the differential push-pull method cannot be performed, the tracking control operation is performed using a special control method such as a phase contrast method.

Consequently, when performing the reading operation of a signal recorded in the optical discs of the DVD-R/RW standard and the DVD-ROM standard, using the laser light having a wavelength of 660 nm, it is required to include the tracking control circuit by the phase contrast method in addition to the tracking control circuit by the push-pull method, and therefore, there is a problem of a configuration becoming not only complicated but also expensive. In the first and second embodiments, since the laser light having a wavelength of 405 nm is used, the push-pull method can be employed as the tracking control method for all the optical discs of the DVD standard, and therefore, a circuit configuration etc. can be made simple.

Furthermore, in a case of the optical disc called CD-ROM/R/RW of the CD standard, which is the third optical disc, the depth d is set by $d=\lambda/2.6n$, and there can be generated the tracking error signal for performing the tracking control operation by the differential push-pull. The value of this d corresponds to a value of $\lambda/5n$ in a case of the wavelength of 780 nm of the laser light, which is set corresponding to the optical disc of the CD-ROM/R/RW standard.

As described above, according to the first and second embodiments, the tracking control operation can be performed for the second and third optical discs with the laser light having the wavelength corresponding to the specification of the first optical disc, i.e., the shortest wavelength of 405 nm, and therefore, there can be performed the reading operation of signals recorded in the optical discs of different standards in the same optical system.

As described above, when performing the reading operation of signals recorded in the optical discs D of three different standards, since there is used the objective lens 9 with the greatest numerical aperture as well as the laser light having the shortest wavelength, the focal point of the objective lens 9 is so set as to be in positions of the signal recording layers L1 and L2 of the first and second optical discs. However, in the present embodiments according to the present invention, since the focal point of the objective lens 9 is moved by the position adjustment of the collimating lens 6 or the adjustment operation of the liquid-crystal controlling element 34, the focal point can be set in a position of the signal recording layer L3 of the third optical disc.

Furthermore, although the spot of the laser light becomes small in diameter which is formed on the signal recording layer L3 by the focusing operation with the objective lens 9, the spot can be increased in diameter by setting widely a range of an intensity distribution of the laser light used as the spot, so that there can be performed the reading operation of a signal recorded in the third optical disc without trouble.

Moreover, in the first and second embodiments, although the movement operation of the collimating lens 6 in the optical axis direction is performed by the driving signal supplied from the collimating lens drive circuit 33 to the collimating lens drive coil 7, a setting operation of an adjusted position is performed using a signal obtained from the photodetection signal generation circuit 14. For example, a configuration is made such that the driving signal is supplied to the collimating lens drive coil 7 so that the intensity of the return light reflected from the signal recording layers L1, L2, and L3 of the optical disc D and magnitude of the tracking error signal TE and focus error signal FE are set to desired values, and such that the position of the collimating lens 6 is moved for adjustment.

When using the liquid-crystal control optical element 34 as the spherical aberration correction element, a state can be set where the reading operation suitable for each of the optical discs can be performed, by adjusting the driving control signal supplied from the liquid-crystal drive control circuit 35 to the liquid-crystal control optical element 34 so that the intensity of the return light reflected from the signal recording layers L1, L2, and L3 of the optical disc D, and the magnitude of the tracking error signal TE and focus error signal FE are set to the desired values.

Although the reading operation of signals recorded in three kinds of the optical discs of different standards, which are the first optical disc, the second optical disc, and the third optical disc, in the same optical system in the first and second embodiments, the reading operation of signals recorded in two kinds of the optical discs of different standards can also be performed.

Although the collimating lens and the liquid-crystal control optical element are used as elements for correcting a spherical aberration, it is possible to use various spherical aberration correction elements as a matter of course.

Third Embodiment

Figure 3:
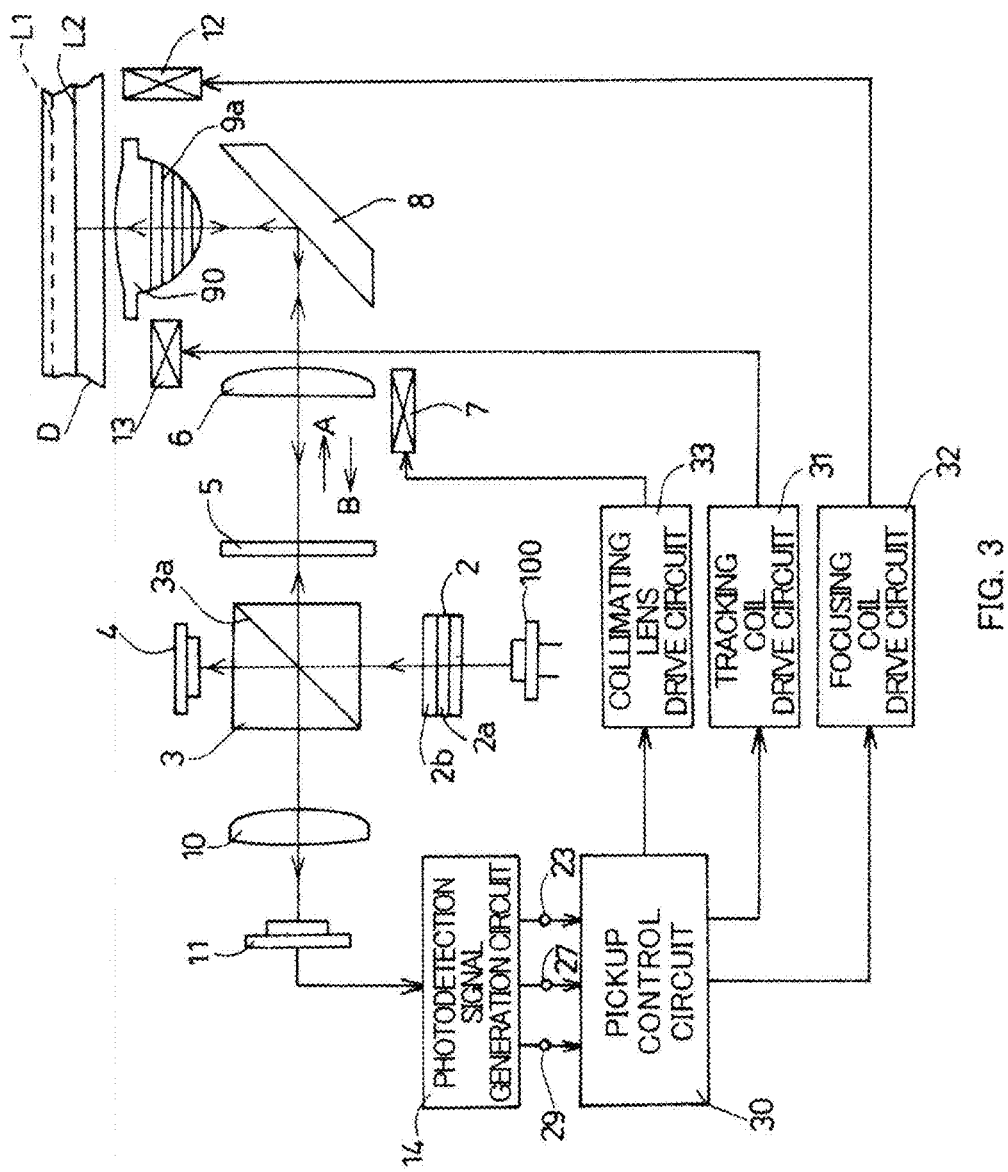
FIG. 3 is a diagram showing an optical pickup apparatus according to a third embodiment of the present invention.

A third embodiment shown in FIG. 3 will next be described. In FIG. 3, components equivalent to those shown in FIG. 1 are designated by the same reference numerals to omit the descriptions thereof.

There is described a case where it is assumed that the first optical disc is the optical disc of the CD standard and the second optical disc is the optical disc of the DVD standard.

In FIG. 3, reference numeral 100 is a laser diode emitting the laser light having a wavelength suitable for the reading operation of a signal recorded in the first optical disc, for example, infrared light having a wave length of 780 nm.

The specification is made such that when the optical disc D is the first optical disc, the signal recording layer L1 of the optical disc is located in a position shown by a broken line, and when the disc D is the second optical disc, the signal recording layer L2 is located in a position shown by a solid line. That is, a distance between the signal recording layer L1 and the surface of the disc D facing the objective lens 90 is greater than a distance between the signal recording layer L2 and the surface of the disc D facing the objective lens 90.

Reference numeral 90 is an objective lens which the laser light reflected by the reflection mirror 8 enters and which makes the laser light be focused on the signal recording layers L1 and L2 of the optical disc D, and of which numerical aperture is set so as to be 0.71, neither 0.45 as the specification of the first optical disc, nor 0.6 as the specification of the second optical disc.

A value of 0.71 is a value corresponding to the numerical aperture 0.6 for the second optical disc, for which the laser light having a wavelength of 660 nm is specified. By the value being set as above, the laser light can be focused on the signal recording layer L2 of the second optical disc. The objective lens 90 having the value of the numerical aperture thus set, has an annular diffraction grating 9a formed on an incident face thereof as shown, and allows only the laser light passing through an optical axis center portion of the objective lens 90 to be focused on the signal recording layer L1 of the first optical disc. That is, a configuration is made such that the numerical aperture of the optical axis center portion of the objective lens 90 is set so as to be the numerical aperture corresponding to the first optical disc, for example, 0.45.

Reference numeral 12 is a focusing coil for performing the focusing operation of the laser light by moving the objective lens 90 in a direction perpendicular to the signal surface of the optical disc D, and reference numeral 13 is a tracking coil for moving the objective lens 90 in a radial direction of the optical disc D.

As a result of a driving signal, which is output from the tracking coil drive circuit 31 and corresponds to the tracking error signal TE, being supplied to the tracking coil 13, the objective lens 90 is moved in the radial direction of the optical disc D, wherein the direction of movement is such a direction that the above tracking error signal TE is reduced in value: As a result of such an operation being performed, there can be performed an operation, i.e., the tracking control operation, for making a laser spot formed by the focusing operation with the objective lens 90 follow the signal track provided on the signal recording layers L1 and L2 of the optical disc D.

As a result of a focusing signal, which is output from the focusing coil drive circuit 32 and corresponds to the focusing error signal FE, being supplied to the focusing coil 12, the objective lens 90 is moved in the direction perpendicular to the signal surface of the optical disc D, wherein the direction of movement is such a direction that the above focusing error signal FE is reduced in value. As a result of such an operation being performed, there can be performed an operation, i.e., the focusing control operation, for focusing the laser light to form the laser spot, which is formed by the focusing operation with the objective lens 90, on each of the signal recording layers L1 and L2 of the optical disc D.

As a result of a driving signal, which is output from the collimating lens drive circuit 33 and corresponds to the collimating lens position control signal, being supplied to the collimating lens drive coil 7, the collimating lens 6 can be moved in the directions of the arrows A and B which is the optical axis direction.

The collimating lens 6 is thus moved in the directions of the arrows A and B, and such a movement operation is performed corresponding to the optical disc D to be used, i.e., the first optical disc or the second optical disc. The collimating lens 6 for being controlled as to movement by such an operation is set in such a position that a spherical aberration is corrected, i.e., a spherical aberration is the smallest, in the optical discs to be used.

As described above, the correction operation of a spherical aberration is performed by the position adjustment of the collimating lens 6, a configuration is made such that the emitted light of the collimating lens 6 becomes the divergent light when using the first optical disc. That is, by making the emitted light of the collimating lens 6 into the divergent light, the focal point by the objective lens 90 is so adjusted as to be in a position on the signal recording layer L1.

The third embodiment according to the present invention shown in FIG. 3 is configured as described above, and an operation of the optical pickup apparatus configured as above will next be described. When performing the reproduction operation of a signal recorded in the optical disc D, the drive current is supplied to a laser diode 100, and the laser light having a wavelength of 780 nm is emitted from the laser diode 100. The laser light emitted from the laser diode 100 enters the diffraction grating 2, to be divided into the 0th order light, the +1st order light, and −1st order light by the diffraction grating portion 2a making up the diffraction grating 2 and converted into the linearly polarized light in the S-direction by the half-wave plate 2b. The laser light having passed through the diffraction grating 2 enters the polarization beam splitter 3, and thereafter, the incident laser light is reflected by the control film 3a included in the polarization beam splitter 3 with a portion of the incident laser light passing therethrough to be applied to the monitor photodetector 4.

The laser light reflected by the control film 3a enters the collimating lens 6 through the quarter-wave plate 5, to be converted into the parallel light due to a function of the collimating lens 6. The laser light converted into the parallel light by the collimating lens 6 is reflected by the reflection mirror 8, and then enters the objective lens 90. The laser light incident on the objective lens 90 is applied as a spot onto each of the signal recording layers L1 and L2 of the optical disc D by the focusing operation with the objective lens 90. The laser light emitted from the laser diode 100 is thus applied onto the signal recording layers L1 and L2 of the optical disc D as the desired spot, the numerical aperture of the objective lens 90 in this case is set at 0.45 for the first optical disc and 0.71 for the second optical disc, by the diffraction grating 9a.

When performing the focusing operation of the laser light with the above objective lens 90, a spherical aberration occurs due to difference in thickness of the protective layer between the signal recording layers L1 and L2, and the signal incident face of the optical disc D, however, the collimating lens 6 is moved in a position where a spherical aberration of the optical disc D is the smallest, and therefore, the influence of a spherical aberration can be eliminated.

When using the first optical disc, the collimating lens 6 performs the correction operation of a spherical aberration and the adjustment operation of the focal point, so that there is performed an operation for forming the laser spot suitable for a signal reading operation on the signal recording layer L1.

There is performed an operation of applying the laser light onto the signal recording layers L1 and L2 provided in the optical disc D by the above described operation, and when performing such an applying operation, the return light reflected from the signal recording layers L1 and L2 enters the objective lens 90 from the optical disc D side. The return light incident on the objective lens 90 enters the polarization beam splitter 3 through the reflection mirror 8, the collimating lens 6, and the quarter-wave plate 5. Since the return light entering the polarization beam splitter 3 has been converted into the linearly polarized light in the P-direction, the return light passes through the control film 3a included in this polarization beam splitter 3.

The return light of the laser light having passed through the control film 3a enters the sensor lens 10, and the astigmatism is generated due to the function of the sensor lens 10. The return light in which astigmatism is generated by the sensor lens 10 is applied to the sensor portion, such as the four-divided sensor, included in the photodetector 11 by the condensing operation of the sensor lens 10. As a result of the return light being thus applied to the photodetector 11, the generation operation of the tracking error signal TE, focus error signal FE, and reproduction signal RF is performed by the photodetection signal generation circuit 14 as described above, by using the change in the form of the spot to be applied to the sensor portion included in the photodetector 11.

When the generation operation of the tracking error signal TE, focus error signal FE, and regenerative signal RF is performed by the photodetection signal generation circuit 14, the pickup control operation is performed by the pickup control circuit 30 to which such signals are input. That is, the control operation of the driving signal supplying to the tracking coil 13 is performed with the supply operation of the tracking control signal from the pickup control circuit 30 to the tracking drive circuit 31, so that the tracking control operation in the optical pickup apparatus is performed.

Moreover, the control operation of the driving signal supplying to the focusing coil 13 is performed with the supply operation of the focusing control signal from the pickup control circuit 30 to the focusing drive circuit 32, so that the focusing control operation in the optical pickup apparatus is performed. The reproduction signal RF read from the optical disc D is supplied to the decode circuit included in the optical disc apparatus, so that the signal demodulation operation is performed.

As described above, there are performed the tracking control operation and focus control operation in the optical pickup apparatus so that there is performed the reading operation of a signal recorded in the optical disc D. Since a portion of the laser light irradiates the monitor photodetector 4 when the reading operation is performed, the value of the drive current to be supplied to the laser diode 100 can be controlled using the monitor signal obtained from the monitor photodetector 4.

Since an output of the laser light can be controlled by controlling the value of the drive current to be supplied to the laser diode 100, there can be performed not only the reading operation of a signal recorded in the optical disc D, but also the adjustment operation of the laser output required when recording a signal into the optical disc D.

Fourth Embodiment

Figure 4:
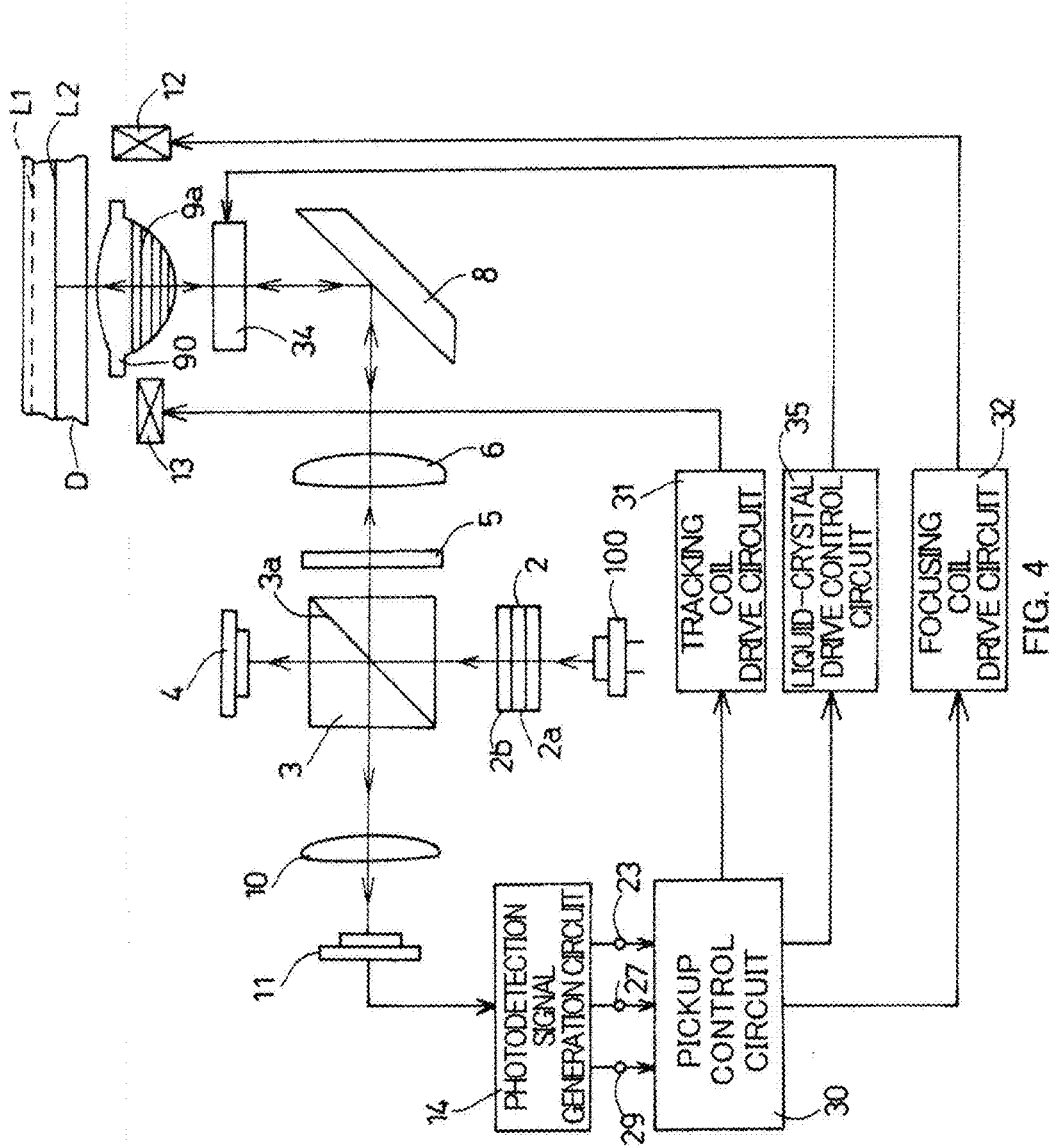
FIG. 4 is a diagram showing an optical pickup apparatus according to a fourth embodiment of the present invention.

A fourth embodiment according to the present invention shown in FIG. 4 will next be described. In FIG. 4, components equivalent to those shown in FIG. 3 are designated by the same reference numerals to omit the descriptions thereof.

In FIG. 4, reference numeral 34 is the liquid-crystal control optical element which uses the liquid crystal as the spherical aberration correction element, and in which there is formed the electrode pattern for correcting a spherical aberration generated from the optical disc D. Reference numeral 35 is the liquid-crystal drive control circuit that controls an operation of the liquid-crystal control optical element 34 based on a control signal supplied from the optical pickup control circuit 30, and that controls liquid crystal so that a pattern shape becomes in a shape suitable for correcting a spherical aberration of each optical disc D to be used.

While the liquid-crystal control optical element 34 is so configured as to correct a spherical aberration as described above, it is also configured such that the laser spot suitable for the signal reading operation is generated on the signal recording layer L1 by moving the focal point of the objective lens 90 when using the first optical disc.

Although the same control operation is performed in the fourth embodiment shown in FIG. 4 as in the third embodiment shown in FIG. 3, a pickup apparatus in FIG. 4 differs in that the correction operation of a spherical aberration is performed with the liquid-crystal control optical element 34 instead of the moving operation of the collimating lens 6.

Tracking Control Operation in Third and Fourth Embodiments

Operations of the third and fourth embodiments shown in FIGS. 3 and 4 are performed as described above, and the tracking control operation by the differential push-pull method described in the third and fourth embodiments will next be described.

Such a tracking control operation is performed using a signal obtained from the four-divided sensor portion 11a, i.e., (A+D)−(B+C), as described above, and such a signal is obtained using difference in height between land and groove formed on the signal recording layer.

That is, when taking $\phi$ to represent a phase difference of the return light obtained from the difference in height of the land and groove, $\lambda$ to represent the wavelength of the laser light, n to represent a refractive index of the protective layer covering the signal recording layers L1 and L2 of the optical disc D, and d to represent a depth of the groove, a phase difference $\phi$ can be expressed by the equation, $\phi=(2\pi/\lambda)\times 2nd$. As obvious from the equation, since the phase difference $\phi$ is n in a case of $d=\lambda/4n$, a push pull signal becomes 0, so that the tracking error signal cannot be generated.

Therefore, a specification of the optical disc is set such that d, which is the depth of the groove, is in the relationship expressed by $d=\lambda/5n$, in consideration of the wavelength, the refractive index, etc. of the laser light to be used.

In the third and fourth embodiments, in a case of, a CD disc which is the first optical disc, the wavelength of the laser light is set at 780 nm and the numerical aperture of the objective lens is set at 0.45, and the tracking error signal for performing the tracking control operation by the differential push-pull can be generated, and therefore, the tracking control operation by the differential push-pull method can be performed without trouble.

On these conditions, when using a DVD disc which is the second optical disc, the numerical aperture of the objective lens 90 is set at 0.71, the depth d of the groove is set by d=λ/5.9n in the case of DVD-R/RW, and there can be generated the tracking error signal for performing the tracking control operation by the differential push-pull. The value of this d corresponds to the value of λ/5n in the case of the wavelength of 660 nm of the laser light, which is set corresponding to the optical disc of the DVD-R/RW standard.

In a case of a DVD-ROM in the optical disc of the DVD standard, the depth d is set by d=λ/4.7n, and there can be generated the tracking error signal for performing the tracking control operation by the differential push-pull. The value of this d corresponds to a value of λ/4n in the case of the wavelength of 660 nm of the laser light, which is set corresponding to the optical disc of the DVD-ROM standard. Since the depth d of the groove of the DVD-ROM is set at λ/4n when using the laser light having a wavelength of 660 nm, the push-pull signal cannot be obtained.

Therefore, in an ordinary optical pickup apparatus, since the tracking control operation by the differential push-pull method cannot be performed, the tracking control operation is performed using a special control method such as a phase contrast method.

Consequently, when performing the reading operation of a signal recorded in the optical discs of the DVD-R/RW standard and the DVD-ROM standard, using the laser light having a wavelength of 660 nm, it is required to include the tracking control circuit by the phase contrast method in addition to the tracking control circuit by the push-pull method, and therefore, there is a problem of a configuration becoming not only complicated but also expensive. In embodiments according to the present invention, since the laser light having a wavelength of 780 nm is used, the push-pull method can be employed as the tracking control method for all the optical discs of the DVD standard, and therefore, a circuit configuration etc. can be made simple.

As described above, according to embodiments of the present invention, the tracking control operation can be performed for the second optical disc with the laser light having the wavelength corresponding to the specification of the first optical disc, i.e., the longest wavelength of 780 nm, and therefore, there can be performed the reading operation of signals recorded in the optical discs of different standards in the same optical system.

As described above, when performing the reading operation of signals recorded in the optical discs D of two different standards, the numerical aperture of the objective lens is set at a numerical aperture greater than that specified for the second optical disc in spite of using the laser light having the longest wavelength, and therefore, the focal point of the objective lens 90 is so set as to be in a position of the signal recording layer L2 of the second optical disc.

Moreover, in the third and fourth embodiments, although the movement operation of the collimating lens 6 in the optical axis direction is performed by the driving signal supplied from the collimating lens drive circuit 33 to the collimating lens drive coil 7, the setting operation of the adjusted position is performed using a signal obtained from the photodetection signal generation circuit 14. For example, a configuration is made such that the driving signal is supplied to the collimating lens drive coil 7 so that the intensity of the return light reflected from the signal recording layers L1, L2, and L3 of the optical disc D, and magnitude of the tracking error signal TE and focus error signal FE are set to desired values and the position of the collimating lens 6 is moved for adjustment.

When using the liquid-crystal control optical element 34 as the spherical aberration correction element, a state can be set where the reading operation suitable for each of the optical discs can be performed, by adjusting the driving control signal supplied from the liquid-crystal drive control circuit 35 to the liquid-crystal control optical element 34 so that the intensity of the return light reflected from the signal recording layers L1 and L2 of the optical disc D, and the magnitude of the tracking error signal TE and focus error signal FE are set to the desired values.

Although the collimating lens and the liquid-crystal control optical element are used as elements for correcting a spherical aberration in the third and fourth embodiments, it is possible to use various spherical aberration correction elements as a matter of course.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
   a single laser diode configured to emit laser light for performing a reproduction operation of a signal recorded on a first type of optical disc and a signal recorded on a second, different type of optical disc, the laser light having a single wavelength associated with the first type of optical disc;
   an objective lens configured to focus the laser light having the single wavelength associated with the first type of optical disc onto a signal recording layer of an optical disc; and
   a spherical aberration correction element disposed in an optical path between the laser diode and the objective lens such that
      when the optical disc is of the first type of optical disc, the spherical aberration correction element emits the laser light having the single wavelength associated with the first type of optical disc as parallel light; and
      when the optical disc is of a second, different type of optical disc, the spherical aberration correction element emits the laser light having the single wavelength associated with the first type of optical disc as divergent light.

2. The optical pickup apparatus of claim 1, wherein:
   the single wavelength associated with the first type of optical disc is shorter than a wavelength associated with the second, different type of optical disc.

3. The optical pickup apparatus of claim 2, wherein a numerical aperture of the objective lens is equal to a numerical aperture associated with the first type of optical disc.

4. The optical pickup apparatus of claim 2, wherein a distance between a signal recording layer of the first type of optical disc and the objective lens and a distance between a signal recording layer of the second, different type of optical disc and the objective lens are the same.

5. The optical pickup apparatus of claim 2, wherein:
   the laser light having the single wavelength is focused by the objective lens onto a signal recording layer of a third type of optical disc for performing a reproduction operation of a signal,
   the third type of optical disc is different from the first type of optical disc and the second type of optical disc,
   a distance between a signal recording layer of the third type of optical disc and the objective lens is different from a distance between a signal recording layer of the first type of optical disc and the objective lens, and
   a distance between the signal recording layer of the third type of optical disc and the objective lens is different from a distance between a signal recording layer of the second type of optical disc and the objective lens.

6. The optical pickup apparatus of claim 2, wherein the spherical aberration correction element includes a collimating lens movable in an optical axis direction of the optical path when correcting spherical aberrations of the optical disc, when the optical disc is one of the first type of optical disc and the second type of optical disc.

7. The optical pickup apparatus of claim 5, wherein the spherical aberration correction element includes a collimating lens movable in an optical axis direction of the optical path when correcting spherical aberrations of the optical disc, when the optical disc is one of the first type of optical disc, the second type of optical disc, and the third type of optical disc.

8. The optical pickup apparatus of claim 6, wherein the collimating lens adjusts a focal point of the objective lens for the optical disc, when the optical disc is one of the first type of optical disc and the second type of optical disc.

9. The optical pickup apparatus of claim 7, wherein the collimating lens adjusts a focal point of the objective lens for the optical disc, when the optical disc is one of the first type of optical disc, the second type of optical disc, and the third type of optical disc.

10. The optical pickup apparatus of claim 2, wherein the spherical aberration correction element includes a liquid-crystal control optical element where a pattern shape becomes in a shape for correcting spherical aberrations of the optical disc, when the optical disc is one of the first type of optical disc and the second type of optical disc.

11. The optical pickup apparatus of claim 5, wherein the spherical aberration correction element includes a liquid-crystal control optical element where a pattern shape becomes in a shape for correcting spherical aberrations of the optical disc, when the optical disc is one of the first type of optical disc, the second type of optical disc, and the third type of optical disc.

12. The optical pickup apparatus of claim 10, wherein the liquid-crystal control optical element adjusts a focal point of the objective lens for the optical disc, when the optical disc is one of the first type of optical disc and the second type of optical disc.

13. The optical pickup apparatus of claim 11, wherein the liquid-crystal control optical element adjusts a focal point of the objective lens for the optical disc, when the optical disc is one of the first type of optical disc, the second type of optical disc, and the third type of optical disc.

14. The optical pickup apparatus of claim 2 further comprising:
a photodetector including a four-divided sensor to be irradiated with return light of the laser light reflected from a signal recording layer of the optical disc, when the optical disc is one of the first type of optical disc and the second type of optical disc, wherein
the photodetector generates a detection signal for generating a tracking error signal for a tracking control by a push-pull method.

15. The optical pickup apparatus of claim 5, further comprising:
a photodetector including a four-divided sensor to be irradiated with return light of the laser light reflected from a signal recording layer of the optical disc, when the optical disc is one of the first type of optical disc, the second type of optical disc, and the third type of optical disc, wherein
the photodetector generates a detection signal for generating a tracking error signal for a tracking control by a push-pull method.

16. The optical pickup apparatus of claim 1, wherein:
the single wavelength associated with the first type of optical disc is longer than a wavelength associated with the second type of optical disc.

17. The optical pickup apparatus of claim 16, wherein a numerical aperture of the objective lens is greater than a numerical aperture associated with the second type of optical disc.

18. The optical pickup apparatus of claim 17, wherein the numerical aperture of the objective lens is set corresponding to the single wavelength and numerical aperture associated with the second type of optical disc.

19. The optical pickup apparatus of claim 16, wherein the objective lens includes an annular diffraction grating for setting a numerical aperture associated with the first type of optical disc.

20. The optical pickup apparatus of claim 16, wherein a distance between a signal recording layer of the first type of optical disc and the objective lens is different from a distance between a signal recording layer of the second type of optical disc and the objective lens.

21. The optical pickup apparatus of claim 16, wherein the spherical aberration correction element includes a collimating lens movable in an optical axis direction of the optical path when correcting spherical aberrations of the optical disc, when the optical disc is one of the first type of optical disc and the second type of optical disc.

22. The optical pickup apparatus of claim 21, wherein the collimating lens adjusts a focal point of the objective lens for the optical disc, when the optical disc is one of the first type of optical disc and the second type of optical disc.

23. The optical pickup apparatus of claim 16, wherein the spherical aberration correction element includes a liquid-crystal control optical element where a pattern shape is formed for correcting spherical aberrations of the optical disc, when the optical disc is one of the first type of optical disc and the second type of optical disc.

24. The optical pickup apparatus of claim 23, wherein the liquid-crystal control optical element adjusts a focal point of the objective lens for the optical disc, when the optical disc is one of the first type of optical disc and the second type of optical disc.

25. The optical pickup apparatus of claim 16, further comprising:
a photodetector including a four-divided sensor to be irradiated with return light of the laser light reflected from a signal recording layer of the optical disc, when the optical disc is one of the first type of optical disc and the second type of optical disc, wherein
the photodetector generates a detection signal for generating a tracking error signal for a tracking control by a push-pull method.

26. The optical pickup apparatus of claim 5, wherein:
the divergent light emitted from the spherical aberration correction element when the optical disc is of the second, different type of optical disc has a first angle of convergence; and
when the optical disc is of the third type of optical disc, and the spherical aberration correction element emits the laser light having the particular wavelength associated with the first type of optical disc as divergent light having a second angle of divergence, the second angle of divergence being greater than the first angle of divergence.

* * * * *